Oct. 25, 1927.  F. W. HUBER  1,647,003
WELL CEMENTING
Original Filed July 3, 1923
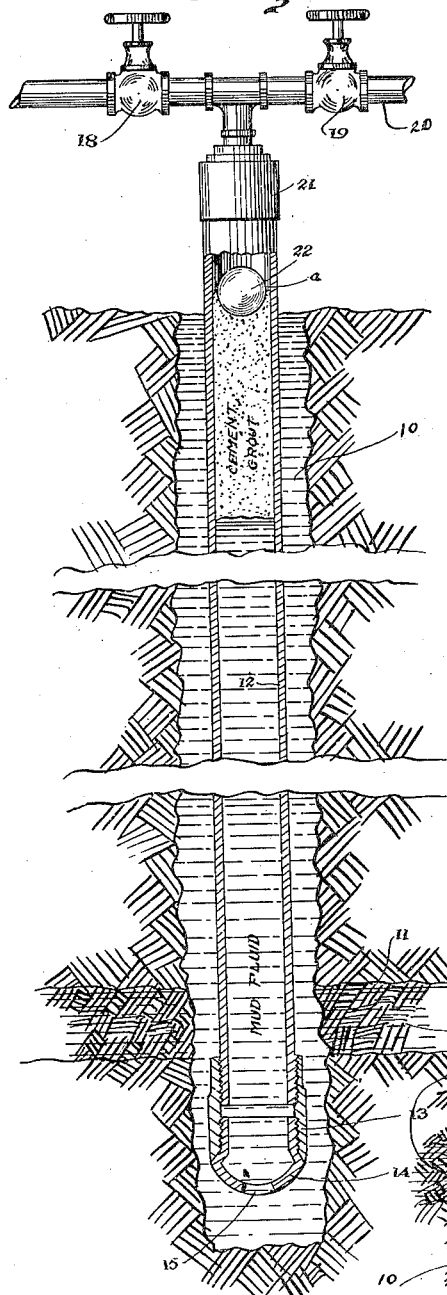
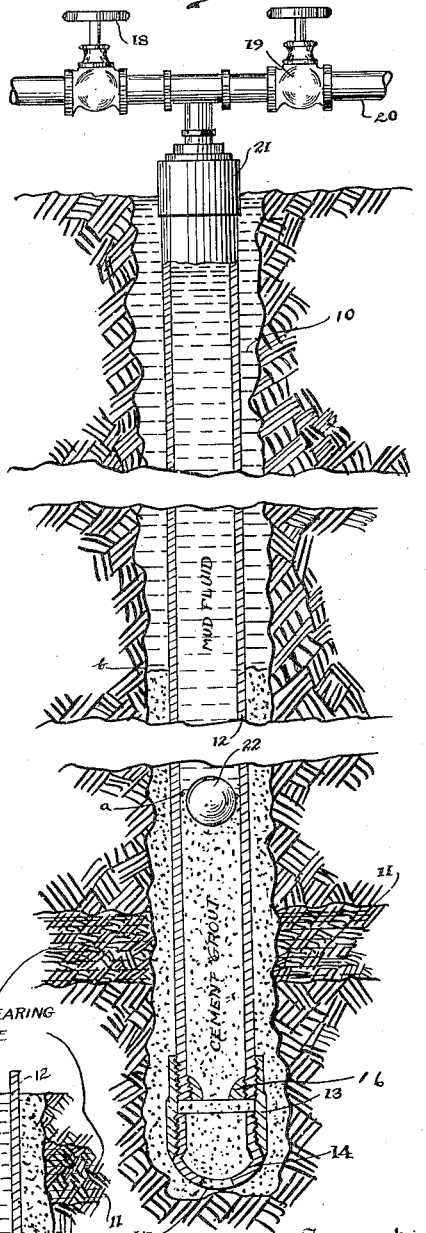
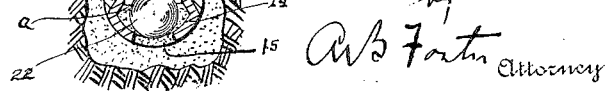

Patented Oct. 25, 1927.

1,647,003

UNITED STATES PATENT OFFICE.

FREDERICK W. HUBER, OF RIVERSIDE, CALIFORNIA.

WELL CEMENTING.

Application filed July 3, 1923, Serial No. 649,357. Renewed September 14, 1927.

The present invention relates to cementing wells having casings, such as oil wells, gas wells, water wells or the like, in which it is desired to seal off a stratum of porous earth formation, by means of a cement grout, placed behind the casing, in other words between the well casing and the walls of the bore hole. For convenience in description reference will be made to sealing off water-bearing strata encountered in boring oil wells, although it is to be understood that other formations or strata can be sealed off and also it is to be understood that the invention is not limited to use in connection with oil wells.

In drilling for oil, water-bearing strata are frequently encountered, and these must each be securely sealed off to prevent the water from entering the bore hole and from flooding the oil bearing strata, it being well known that water entering the oil bearing strata greatly reduces the productive life of the oil well, and greatly reduces the amount of oil which can be taken from a given well.

In accordance with the prior art, a fluid neat cement grout is pumped down through the casing into an annular space between the casing and the walls of the bore hole. The most practical of the methods heretofore used commercially, so far as I am advised, has been the "two plug method" devised by Perkins and Double, in which the cement grout is separated from the inert pumping fluid in the casing, by upper and lower plugs or barriers, so that the column of fluid cement grout is at all times kept separate from the inert fluid, (mud fluid or water being commonly used) until the cement grout has reached the bottom of the casing. The lower plug is provided with a collapsible washer, and when this lower plug strikes the shoe or protector carried by the bottom of the casing, the said washer collapses and allows the cement grout to be extruded into the space surrounding the bottom of the casing. Pumping is continued until the two plugs come together, when the pump pressure immediately rises to such an extent as to stall the pumps. The casing, which has been held a few feet above the bottom of the hole is then lowered to the bottom of the hole and the entire structure then allowed to stand until the cement has set and hardened to the desired extent, after which the plugs are bored out, together with the small amount of cement in the bottom of the casing and in the bottom of the bore hole, after which a test is made to determine that the water has been completely shut off. If the water is shown to be completely shut off, the boring is then again continued.

I have now found that cement grout does not readily mix with either water or mud fluid under ordinary conditions, so that it is possible to considerably simplify the cementing operation, by the employment of a float which is of somewhat smaller diameter than the interior of the casing, which float is so constructed as to be capable of forming a valve or shut-off when the same reaches the lower end of the casing. Reference is made to the accompanying drawing, in which Figure 1 represents the condition of affairs at an early stage of the cementing operation, and Figure 2 represents the conditions at the end of the treating operation, when the cement is in its final place and is ready to be allowed to set and harden. Fig. 3 shows an intermediate stage.

In the annexed drawing a bore hole 10 has been made, this bore hole continuing a short distance past a water bearing stratum 11, which stratum is to be sealed off. A casing 12 is placed in the hole, this being provided at its lower end with a shoe 13, and a protector 14, these being of a form commonly used in the art. The shoe 13 in this case can be an imperforate cast iron or other cylindrical member connecting the lower end of the casing 12 with a somewhat conical protector 14, this latter being closed at the sides and having a central end opening 15 in its bottom. In place of using imperforate shoe and protector, it may in some cases be advisable to use a perforated shoe and protector. In this event, or for other reasons, if it is desired to do so, a washer 16 may be carried by (as by being suitably screwed into) the lower part of the casing 12, as indicated in Figure 2.

It is to be understood that this washer 16 does not have to be at the very extremity of the casing, but can be placed a short distance above the lower extremity of the casing. This washer fits tightly in the casing and is rigidly secured thereto in any suitable manner, (screw threads being shown in the drawing for this).

The first step in the cementing off of the water bearing stratum is to establish a free circulation between the casing and the bore hole. This is done by placing the casing in about the position shown in Figure 1, namely, with the shoe of the casing raised a few feet above the bottom of the bore hole, the valve 18 being closed and the valve 19 open, the pipe 20 being connected with a suitable force pump. A liquid such as water or mud fluid is then forced downwardly through the casing, this coming up between the casing and the bore hole, and the casing and its connections being slowly raised and lowered through a distance of several feet. When circulation has thus been established, the casing is brought back into a position such as is shown in Figure 1, the fluid cement grout is then pumped in through the pipe 20, until the desired amount of the grout has been introduced. The cap 21 is then removed and the float 22 introduced, the cap 21 being then again replaced. Water or mud fluid is then pumped in through the pipe 20 until the float 22 strikes against the washer 16 (if this is used) or against the hole in the bottom of the protector 14, (as shown in Fig. 3).

The float 22 is of a specific gravity very slightly lower than that of the cement grout and considerably heavier than water or ordinary mud fluid. In this connection it may be noted that cement grout most suitable for the cementing of wells, weighs about 110 to 125 pounds per cubic foot, while drilling mud weighs only from 70 to 90 pounds per cubic foot, so that there is a considerable difference in specific gravity between the two liquids. For the best results, the float 22, can be so made that its weight per cubic foot will be say 5 or 10 pounds less than that of the cement grout to be used. In the drawing I have shown the float 22 as being spherical in shape. However, I desire it to be understood that I am not limited to a float of spherical shape, for the reason that floats of other shapes can be employed, so long as they will readily form a valve plug to coact with the washer 16, or with the opening 15 in the bottom of the protector 14.

It is to be understood that the float 22 will be of somewhat smaller diameter than the internal diameter of the casing 12. The drawing shows the dotted line $a$ representing the upper surface of the cement grout, which is in substantially free contact with the liquid above the same, such as water or mud fluid. However, the latter being of considerably lower specific gravity than the cement grout, the two will not mix to any substantial extent, or if they do mix somewhat, they become mixed only for a few feet of the height of the column. The pumping being continued until the float finds its position at the bottom of the casing to shut off further flow, the pump pressure will immediately rise sufficiently to stall the pumps, showing the operator that the cement has all or practically all been forced out of the casing. Valve 19 is then at once closed, and in ordinary practice I find it advisable to then open valve 18 to let out a small and measured quantity of the water or mud fluid, which will allow a small amount of the cement grout to reenter the lower part of the casing. The pumping operation is preferably conducted while the casing is in approximately the position shown in Figure 1, namely, a few feet above the bottom of the bore hole. Having drawn a small amount of the cement grout back into the casing, and having tightly closed valve 18, the casing is then lowered into place as shown in Figure 2, which leaves the bulk of the cement grout behind the casing, namely, between the wall of the casing and the wall of the bore hole, the upper end of the annular cement plug being shown at $b$ and the upper end of the cement in the casing being shown at $a$. The entire structure is then allowed to stand quietly for a sufficient time for the cement grout to set and harden, to the extent necessary to withstand the pressure of the water from the water bearing stratum 11. When this condition has been reached, the cap 21 is removed from the casing, the mud fluid bailed out and the boring continued through the float, through the cement plug in the lower end of the casing, through the protector 14 and down a short distance (say a foot or two) below the bottom of the bore hole as shown in Figure 2, whereupon a test is made to show whether or not the cementing off operation has been successful.

The fluid cement grout used may be that described in my Patent No. 1,452,463 of April 17, 1923, although the present invention can be used with other cement grouts, capable of being pumped.

As an example of the construction of the float I use a wooden sphere turned to a diameter about 2 inches less than the inside diameter of the casing into which it is to be placed. This sphere is bored through with three sets of holes at right angles to one another intersecting at the centre of the sphere. These holes are filled or partly filled with enough lead or Babbitt metal so that the sphere will sink to somewhat over one half its depth in the cement grout. The amount of lead or babbitt, or other weighting material used should be sufficient to give the ball or float the necessary weight, preferably substantially above that of water or mud fluid and only slightly less than that of the neat cement grout to be used.

I claim:

1. In the process of cementing off pervious strata in wells in which cement grout is forced downwardly through and behind the casing and there allowed to set and harden, the improvement which comprises placing upon the cement grout in the casing, a float which is freely carried in the casing without entirely filling the cross section thereof, and then forcing the float and grout downwardly in the casing until the said float closes the lower part of the casing, the float being of a slightly lower specific gravity than the cement grout but of a substantially higher specific gravity than inert fluids commonly used for forcing the grout into place, and thereafter withdrawing from the upper part of the casing, such an amount of fluid as will allow the float to rise a predetermined distance in the casing, with a portion of the cement grout.

2. A method of cementing wells which comprises forcing a thin fluid cement grout, downwardly through the regular well casing by means of hydraulic pressure of an inert liquid introduced above the said cement grout in said casing and in contact with said cement grout, thereby forcing the bulk of the cement grout out of the casing, into the space in the well surrounding the casing, drawing out a predetermined quantity of the inert aqueous fluid from the casing, whereby an equivalent volume of the cement grout is drawn back into the lower portion of the casing, and then holding the cement grout in position until the same has sufficiently hardened.

In testimony whereof I affix my signature.

FREDERICK W. HUBER.